(12) United States Patent
Risdale et al.

(10) Patent No.: US 9,079,341 B2
(45) Date of Patent: Jul. 14, 2015

(54) SERVICEABLE SNAP-IN FASTENER (75) Inventors: Marc R Risdale, Ontario (CA); Robert A Murawski, Clinton Township, MI (US)

(73) Assignee: Illinois Tool Works Inc., Glenview, IL (US)

( * ) Notice: Subject to any disclaimer, the term of this patent is extended or adjusted under 35 U.S.C. 154(b) by 256 days.

(21) Appl. No.: 13/581,525

(22) PCT Filed: Mar. 17, 2011

(86) PCT No.: PCT/US2011/028854
§ 371 (c)(1),
(2), (4) Date: Aug. 28, 2012

(87) PCT Pub. No.: WO2011/119411
PCT Pub. Date: Sep. 29, 2011

(65) Prior Publication Data
US 2012/0317757 A1  Dec. 20, 2012

Related U.S. Application Data (60) Provisional application No. 61/316,888, filed on Mar. 24, 2010.

(51) Int. Cl.
| | |
|---|---|
| *B29C 45/14* | (2006.01) |
| *F16B 13/00* | (2006.01) |
| *B29C 45/16* | (2006.01) |
| *B29L 31/00* | (2006.01) |

(52) U.S. Cl.
CPC ..... *B29C 45/1635* (2013.01); *B29L 2031/7282* (2013.01); *Y10T 24/44026* (2015.01)

(58) Field of Classification Search
CPC .............. B29C 45/1635; Y10T 24/44026; Y10T 24/42; Y10T 24/45105; Y10T 24/309; F16B 5/065; B29L 2021/7282
USPC .......... 24/297, 458, 581.11, 453, 571, 704.1; 411/508, 509, 510, 913; 403/397; 296/1.08; 248/226.11; 264/255, 242, 264/267
See application file for complete search history.

(56) References Cited

U.S. PATENT DOCUMENTS 3,577,603 A  *  5/1971  Seckerson et al. ............ 411/510
5,049,262 A     9/1991  Galton et al.
(Continued)

FOREIGN PATENT DOCUMENTS

DE     4326554 A1    2/1995
EP     1447575 A1    8/2004

OTHER PUBLICATIONS

An International Search Report, dated Jul. 4, 2011. In International Application No. PCT/US2011/028854.

*Primary Examiner* — Abigail Morrell
(74) *Attorney, Agent, or Firm* — Paul F. Donovan (57) ABSTRACT

A one piece snap-in retainer of multi-shot molded construction adapted to separate along a molded-in fracture line upon application of axial tensioning force. The retainer includes a base clip portion of molded polymer with a proximal barrel segment and a distal snap-in element projecting outwardly away from the barrel segment. The retainer also includes a head portion of molded polymer at least partially surrounding the proximal barrel segment. The molded-in fracture line includes a protuberance molded into the proximal barrel segment or the head portion at the interface in combination with an opposing complimentary mating depression molded into the other of the proximal barrel segment or the head portion.

16 Claims, 4 Drawing Sheets

(56) References Cited

U.S. PATENT DOCUMENTS

| | | |
|---|---|---|
| 5,647,713 A | 7/1997 | Ge et al. |
| 6,715,185 B2 | 4/2004 | Angelloti |
| 6,752,950 B2 | 6/2004 | Clarke |
| 7,017,239 B2 | 3/2006 | Kurily et al. |
| 7,152,281 B2 | 12/2006 | Scroggie |
| 7,278,810 B2 | 10/2007 | Bauer |
| 2008/0052878 A1* | 3/2008 | Lewis et al. ............... 24/297 |

* cited by examiner

SERVICEABLE SNAP-IN FASTENER

This non-provisional application is based on International Application No. PCT/US2011/028854, filed Mar. 17, 2011 and claims the benefit of, and priority from, U.S. Provisional application 61/316,888, filed Mar. 24, 2010.

CROSS-REFERENCE TO RELATED APPLICATION

This non-provisional application claims the benefit of, and priority from, U.S. Provisional Application 61/316,888 filed Mar. 24, 2010 the contents of which are hereby incorporated by reference in their entirety as if fully set forth herein.

TECHNICAL FIELD

The present invention relates generally to fastening structures, and more particularly to snap-in fasteners (also referred to as retainers) adapted to connect a panel or the like in opposing relation to another structure. More particularly, the present invention relates to snap-in fasteners formed by multi-shot molding such that a unitary structure is provided with different portions formed during different molding shots such that portions may be separated from one another along pre-defined interfaces if desired.

BACKGROUND OF THE INVENTION

It is known to use snap-in fasteners to connect panels or other structures in opposing relation to one another. A number of prior component connection devices and techniques are known and disclosed in the art. By way of example only, and not limitation, these include the connection devices and techniques disclosed in U.S. Pat. No. 6,715,185 to Angellotti; U.S. Pat. No. 6,752,950 to Clarke; U.S. Pat. No. 7,017,239 to Kurily et al.; and U.S. Pat. No. 7,152,281 to Scroggie, the teachings of all of which are incorporated by reference in their entirety as if fully set forth herein. Such fasteners typically include a "W" base clip or other snap-in element that is inserted into an acceptance opening in a primary support panel such as sheet metal forming a structural portion of a vehicle, appliance or the like. Such fasteners also include a head portion that is mounted at a secondary panel or other structure such as a piece of trim or the like. In some environments of use, the head portion may be secured within an intermediate doghouse structure disposed at a surface of the secondary panel which is oriented in facing relation to the primary support structure. The head portion also may be held directly to the secondary panel by adhesive bonding using tape or the like. Of course, other connection techniques may likewise be used. Thus, the fastener may provide an operative connection between the primary support structure and the secondary panel or other structure without the need to introduce fastener openings through the secondary panel.

In some past constructions, the snap-in fasteners have been of unitary construction formed from techniques such as injection molding or the like. Such unitary constructions have performed well and have the benefit of being formed in a single molding operation but they do not provide a mechanism to separate the panels after the connection has been made.

In some other past constructions, the snap-in fasteners have incorporated a base clip portion and a head portion which are formed separately and then joined together. The attachment between the base clip portion and the head portion can be overcome by the application of a sufficient axial tensioning force such that the panels or other connected structures can be pulled apart for servicing or replacement if desired without damaging the panel. That is, the portions of the fastener separate before the panels are damaged. While such multi-piece structures perform well, there is a degree of inherent complexity in the initial formation process since two different parts must be formed. This typically requires two different molds. Accordingly, a snap-in fastener that can be formed as a one-piece structure and which nonetheless permits the separation of panels or other connected articles after the connection is made would represent a novel and useful advancement over the prior art.

SUMMARY OF THE INVENTION

The present invention provides advantages and alternatives over the prior art by providing a snap-in retainer formed by a multi-shot molding process with the base clip portion and the head portion being formed in different shots and with a pre-established internal fracture line at an interface between the base clip portion and the head portion. Upon application of sufficient force, the retainer separates along the fracture line thereby permitting the panels or other structures to be disengaged. The previously adjoined panels may then be replaced or repaired.

In accordance with one exemplary aspect, the present invention provides a one piece snap-in retainer of multi-shot molded construction adapted to separate along a molded-in fracture line upon application of axial tensioning force. The retainer includes a base clip portion of molded polymer which is adapted for snap-fit insertion into an acceptance opening in a first structure. The base clip portion includes a proximal barrel segment and a distal snap-in element projecting outwardly away from the barrel segment. The retainer also includes a head portion of molded polymer adapted for operative connection to a second structure for disposition in opposing relation to the first structure. The head portion at least partially surrounds the proximal barrel segment in bonded relation to the proximal barrel segment along an interface with the molded-in fracture line extending circumferentially about the proximal barrel segment at the interface. The molded-in fracture line includes a protuberance molded into the proximal barrel segment or the head portion at the interface in combination with an opposing complimentary mating depression molded into the other of the proximal barrel segment or the head portion at the interface such that the protuberance is normally nested in bonded relation within the mating depression. A method for forming the retainer is also provided.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 1:
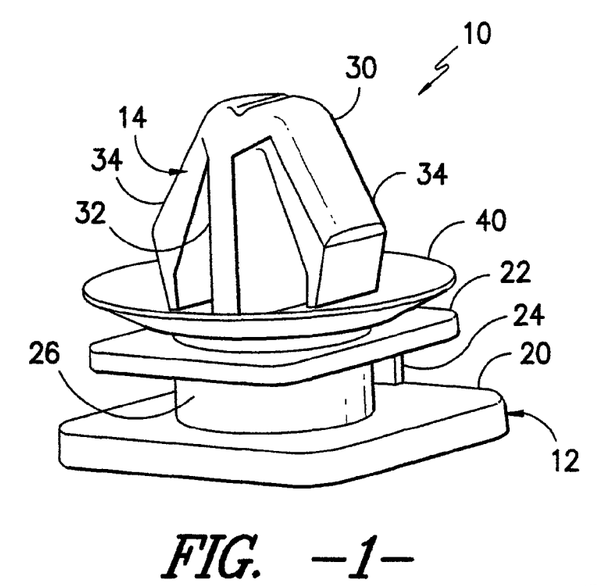
FIG. 1 is a schematic perspective view of an exemplary panel fastener consistent with the present invention.
Figure 5:
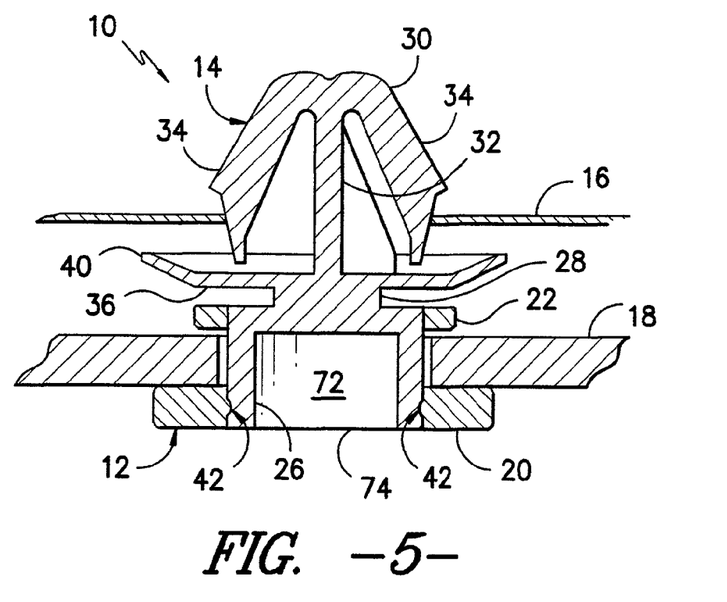
FIG. 5 illustrates an exemplary panel fastener consistent with the present invention in connecting relation between a primary panel and a secondary structure.
Figure 6:
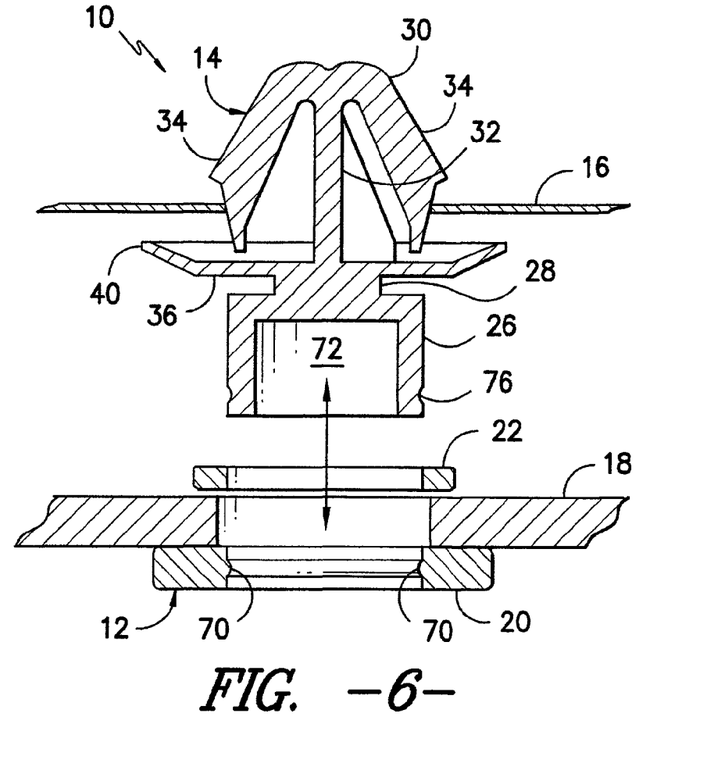
FIG. 6 is a view similar to FIG. 5 illustrating the panels separated from one another and with the head portion of the fastener separated from the base clip portion.

Reference will now be made to the drawings wherein to the extent possible, like elements are designated by like reference numerals in the various views. As shown in FIG. 1, an exemplary snap-in fastener 10 also referred to as a "retainer" includes a head portion 12 and a base clip portion 14 projecting outwardly away from the head portion 12. As best seen in FIGS. 5 and 6, during use the base clip portion 14 is held in locked relation within an opening in a primary structure 16 such as a structural panel of sheet metal, plastic or the like. The head portion 12 is adapted to be held at a secondary structure 18 such as a doghouse connector or slot opening in a piece of trim or the like in a manner as will be well known to those of skill in the art. Thus, the primary structure 16 and the secondary structure 18 are held in a fixed juxtaposed relation.

As seen in FIG. 1, in the illustrated exemplary construction, the head portion 12 includes a first circumferential flange 20 in spaced-apart relation to a second circumferential flange 22. A connecting wall 24 may extend partially along an edge between the first circumferential flange 20 and second circumferential flange 22. As will be appreciated, the spacing between the first circumferential flange 20 and second circumferential flange 22 defines a gap for attachment of the secondary structure 18 during use (FIG. 5).

In the illustrated exemplary construction, the base clip portion 14 includes a rear barrel segment 26 which runs in intersecting relation through the first circumferential flange 20 and the second circumferential flange 22. The rear barrel segment 26 may be substantially cylindrical, although other geometries may likewise be used if desired. As will be described further hereinafter, the rear barrel segment 26 is integral with other portions of the base clip portion 14 and is formed such that the first circumferential flange 20 and second circumferential flange 22 are normally disposed in at least partial surrounding relation to portions of the rear barrel segment 26. As shown, the rear barrel segment 26 may include a reduced diameter hub 28 (FIGS. 5 and 6) projecting above the second circumferential flange 22.

As best seen through joint reference to FIGS. 1 and 5, the base clip portion 14 of the fastener 10 further includes a snap-in element 30 adapted for press-fit insertion into an opening in the primary structure 16. In the illustrated, exemplary construction, the snap-in element 30 has a generally "W" shape including a central post 32 and a pair of opposing angled wing elements 34 extending away from the central post 32 in downwardly angled relation towards the head portion 12. Of course, the snap-in element 30 may have any number of other configurations including single-wing structures, crown prong structures and the like.

In the illustrated exemplary construction, the base clip portion 14 also includes a support platform 36 (best seen in FIGS. 5 and 6) disposed in opposing relation to the free ends of the wing elements 34 at the proximal end of the central post 32. As shown, the support platform 36 may extend radially away from the reduced diameter hub 28. An umbrella flange 40 of pliable character may be disposed at least partially about the perimeter of the support platform 36. In this regard, the umbrella flange may be either continuous or discontinuous. As will be appreciated, during use the support platform 36 and umbrella flange 40 will define a surface opposing the wing elements 34 to hold the primary structure 16 in place.

As best seen in FIG. 5, it is contemplated that the interior interface between the rear barrel segment 26 and the surrounding portions of the head portion 12 will include at least one molded-in stress concentrating fracture line 42 disposed circumferentially about the outer surface of the rear barrel segment 26. The molded-in fracture line is formed by introducing a complementary protuberance and mating depression circumferentially about the interface between the rear barrel segment 26 and the surrounding portions of the head portion 12 during the molding process. In this regard, it is contemplated that the fastener 10 may be formed as a unitary structure by injection molding of suitable polymeric materials such as Nylon 6.6, polyester, acetal resin or the like, including combinations of two or more materials which melt bond to one another. Thus, while a single material may be used, two or more materials may also be used.

Figure 2:
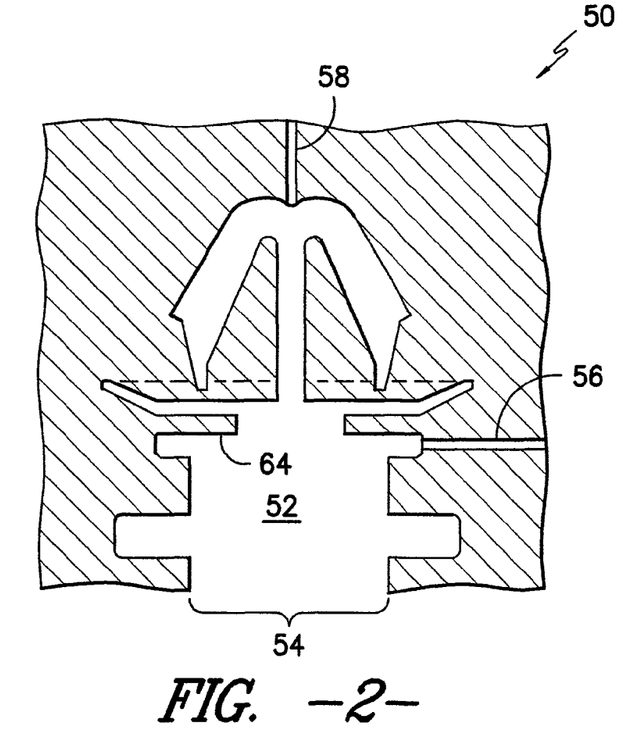
FIG. 2 is a schematic cut-away view of a mold cavity adapted for injection molding of the two-shot panel fastener of FIG. 1.

By way of example only, and not limitation, it is contemplated that the two shot injection molding process may be carried out in a mold 50 (FIG. 2) having a three-dimensional mold cavity 52 conforming to the desired final geometry of the fastener 10. According to the exemplary practice, the mold 50 will further include a tooling access port 54 for selective introduction of core tooling during the molding process. The mold may include a first injection port 56 for introduction of molten polymer during a first injection shot. The mold also may include a second injection port 58 for introduction of molten polymer during a second injection shot. Of course, it should be understood that the mold illustration highly simplified for explanatory purposes.

Figure 3:
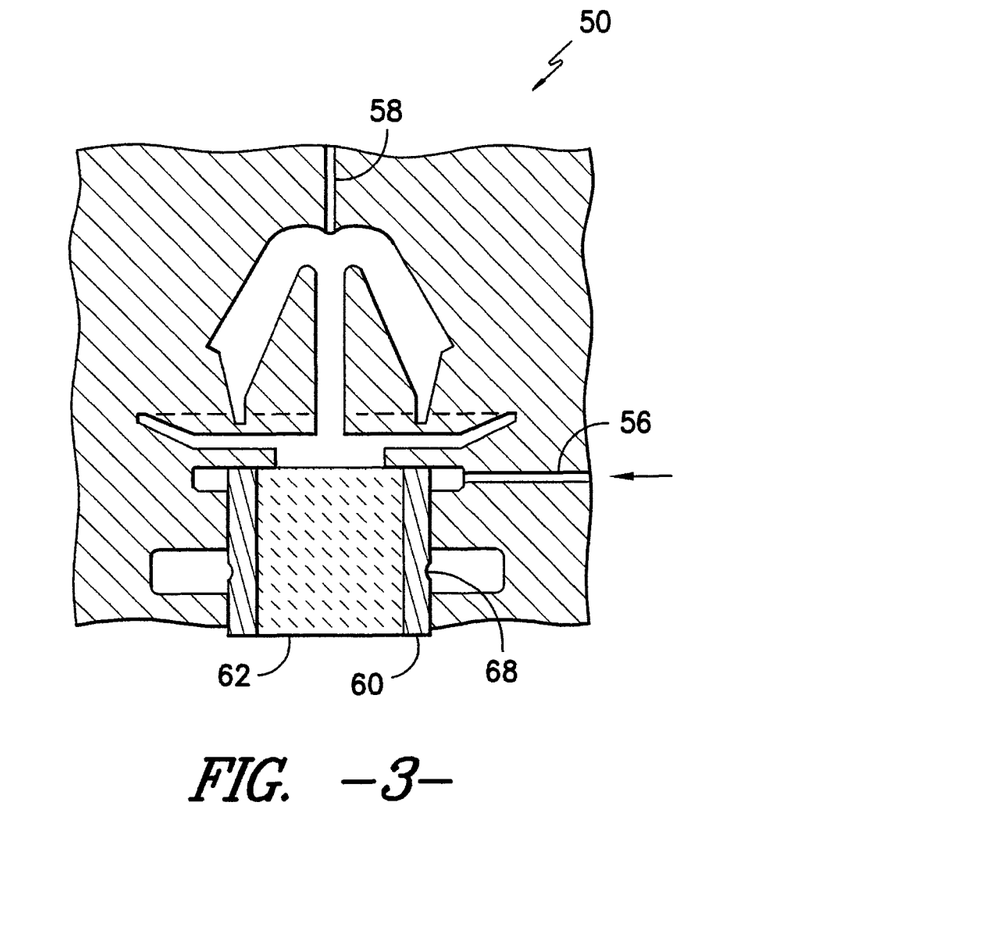
FIG. 3 is a schematic cut-away view illustrating formation of the head portion of the panel fastener of FIG. 1 during a first injection molding shot with mold tooling in place.

As illustrated in FIG. 3, during a first injection shot, a sleeve insert tool 60 having a cross-sectional size and shape conforming to the desired rear barrel segment 26 is inserted through the tooling access port 58 to occupy the zone within the mold cavity corresponding to the desired relative position of the rear barrel segment 26 in the final construction. As will be noted, the sleeve insert tool 60 preferably has a length slightly longer than the length of the rear barrel segment 26 such that the sleeve insert tool 60 can span the distance from the bottom of the first circumferential flange 20 to the top of the second circumferential flange 22. An axial plug 62 which is slideable relative to the sleeve insert tool 60 is inserted at the interior of the sleeve insert tool 60. As can be seen, the outer diameter of the axial plug 62 closely approximates the inner diameter of the sleeve insert tool 60 to form a substantially sealed relation. As illustrated, a shoulder surface 64 (FIG. 2) in the mold cavity 52 limits insertion of the sleeve insert tool 60 as well as the axial plug 62 such that the sleeve insert tool 60 and the axial plug 62 extend to the desired depth corresponding to the position just below the zone of the cavity corresponding to the reduced diameter hub 28 in the final construction.

With the sleeve insert tool 60 and the axial plug 62 in place, a first shot of molten polymer may be introduced through the first injection port 56 to fill the zones of the mold cavity corresponding to the head portion 12. Thus, the first shot forms the first and second circumferential flanges 20, 22 as well as the connecting wall 24. Since these zones of the mold cavity are all interconnected, a single shot may be used for filling. However, in the event that the zones are not interconnected, multiple shots feeding different zones may be used if desired.

As illustrated, the sleeve insert tool 60 includes an undercut in the form of a grooved depression 68 extending circumferentially about the exterior of the sleeve insert tool at a height corresponding to the zone of the mold cavity in which the first circumferential flange 20 is formed. In this regard, the sleeve insert tool 60 may be cylindrical with the grooved depression extending around the entire perimeter. However, the grooved depression 68 may also be discontinuous about the perimeter if desired. While the grooved depression 68 is illustrated as having a generally parabolic profile, it is also contemplated that an angled profile may be used instead. It is also contemplated that the grooved depression 68 may be substituted with a raised ring defining a protuberance of angled or curved profile if desired. Regardless of whether the sleeve insert tool 60 presents a circumferential depression or a circumferential protuberance, a reverse irregularity 70 is formed on the inner surface of the opposing circumferential flange when it is molded during the first shot. By way of example only, in the event that the grooved depression 68 extends completely around the circumference of the sleeve insert tool 60, the reverse protrusion will extend completely around the inner diameter of the first circumferential flange 20 formed during the first shot. Of course, such an irregularity may also be formed at the second circumferential flange 22 and/or at other positions as may be desired depending upon the actual configuration of the head portion.

Figure 4:
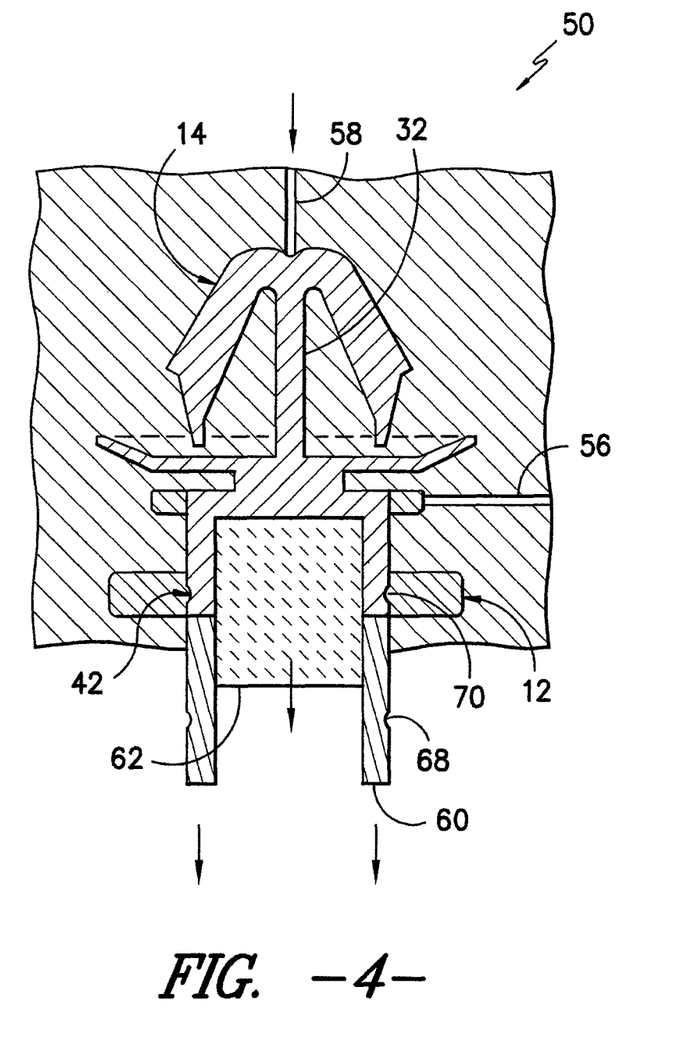
FIG. 4 is a schematic cut-away view similar to FIG. 3 illustrating formation of the base clip portion of the panel fastener of FIG. 1 during a second injection molding shot with mold tooling repositioned for formation of the base clip portion.

Referring now to FIG. 4, once the molding of the head portion 12 is complete, the sleeve insert tool 60 and the axial plug 62 may each be partially withdrawn to new positions as illustrated. In this condition, a second shot of polymer may be introduced to fill the available voids in the mold cavity which are not occupied by tooling or the previously formed head portion. Since these zones of the mold cavity are all interconnected, a single shot may be used for filling. However, in the event that the zones are not interconnected, multiple shots feeding different zones may be used if desired.

The polymer introduced during the second shot may be the same or different from the polymer in the first shot. However, it will preferably form a secure bond with the polymer in the first shot. At the same time the previously formed irregularity 70 on the inner surface of the head portion should not be degrade significantly. Thus, it may be desirable to use a polymer with a slightly lower melting temperature in the second shot.

As best seen in FIG. 5, following solidification of the second shot, a stress concentrating fracture line 42 is established along the rear barrel segment 26 at the location of the irregularity 70. Moreover, following final removal of the sleeve insert tool 60 and the axial plug 62, a hollow interior 72 is established axially at the interior of the rear barrel segment 26 where the axial plug 62 was previously located. This provides a rear axial opening 74 which may be of use.

As best seen through joint reference to FIGS. 5 and 6, in the event that it is desired to remove the secondary structure 18 from the primary structure 16, a prying force may be applied by insertion of a tool (not shown). As the prying force is applied, the head portion 12 will break away from the as-molded relation about the rear barrel segment 26 in a controlled manner. Without being limited to a particular theory, it is believed that the molded-in irregularities at the interface between the head portion 12 and the rear barrel segment 26 may provide stress concentrators which facilitate controlled and reproducible fracture. Thus, a fastener formed as a unitary structure may separate in substantially the same manner as prior two-piece structures.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

Various features of the invention are set forth in the following claims.

What is claimed is:

1. A one piece snap-in retainer of multi-shot molded construction adapted to separate along a molded-in fracture line upon application of axial tensioning force, the retainer comprising:
    a base clip portion of molded polymer, the base clip portion being adapted for snap-fit insertion into an acceptance opening in a first structure, the base clip portion including a proximal barrel segment and a distal snap-in element projecting outwardly away from the barrel segment; and
    a head portion of molded polymer, the head portion being adapted for operative connection to a second structure for disposition in opposing relation to the first structure, wherein the head portion at least partially surrounds the proximal barrel segment in melt-bonded relation to the proximal barrel segment along an interface with the molded-in fracture line extending circumferentially about the proximal barrel segment at the interface, the molded-in fracture line including a protuberance molded into one of the proximal barrel segment and the head portion at the interface in combination with an opposing complimentary mating depression molded into the other of the proximal barrel segment and the head portion at the interface such that the protuberance is normally nested in melt-bonded relation within the mating depression, wherein the protuberance and the mating depression define stress concentrating irregularities at the interface facilitating fracture at the interface and separation of the head portion from the base clip portion upon application of the axial tensioning force; and
    wherein the proximal barrel segment is cylindrical and includes a rear axial opening and a hollow axial core extending from the rear axial opening to a depth beyond the molded-in fracture line.

2. The one piece snap-in retainer as recited in claim 1, wherein the head portion is formed from a first injection molded polymer and the base clip portion is formed from a second injection molded polymer, the second injection molded polymer having a melting point which is less than that of the first injection molded polymer.

3. The one piece snap-in retainer as recited in claim 1, wherein the snap-in element has a W-shaped construction including a pair of wing elements extending in angled relation away from a support post and wherein a hub portion of reduced diameter relative to the proximal barrel segment is disposed between the proximal barrel segment and the support post with a support platform extending radially away from the reduced diameter hub portion.

4. The one piece snap-in retainer as recited in claim 3, wherein the support platform includes an angled umbrella flange disposed at least partially along a perimeter of the support platform.

5. The one piece snap-in retainer as recited in claim 4, wherein the base clip portion is a contiguous structure formed during a single shot of a multi-shot injection molding process.

6. The one piece snap-in retainer as recited in claim 1, wherein the head portion includes a first circumferential flange defining a first platform at least partially surrounding the proximal barrel segment in melt-bonded relation to the proximal barrel segment and a second circumferential flange defining a second platform at least partially surrounding the proximal barrel segment in melt-bonded relation to the proximal barrel segment at a position spaced apart from the first circumferential flange, wherein the first platform and the second platform each extend radially beyond the perimeter of the proximal barrel segment.

7. The one piece snap-in retainer as recited in claim 6, wherein the head portion further includes at least one connecting wall extending between the first circumferential flange and the second circumferential flange.

8. The one piece snap-in retainer as recited in claim 7, wherein the head portion is a contiguous structure formed during a single shot of a multi-shot injection molding process.

9. The one piece snap-in retainer as recited in claim 1, wherein the protuberance is in the form of a raised ring projecting radially inwardly from a portion of the head portion surrounding the proximal barrel segment, and wherein the mating depression is molded into the proximal barrel segment in relief to the protuberance.

10. A one piece snap-in retainer of multi-shot molded construction adapted to separate along a molded-in fracture line upon application of axial tensioning force, the retainer comprising:
a base clip portion of injection molded polymer, the base clip portion being adapted for snap-fit insertion into an acceptance opening in a first structure, the base clip portion including a cylindrical proximal barrel segment and a distal snap-in element projecting outwardly away from the barrel segment, wherein the snap-in element has a W-shaped construction including a pair of wing elements extending in angled relation away from a support post and wherein a hub portion of reduced diameter relative to the proximal barrel segment is disposed between the proximal barrel segment and the support post with a support platform extending radially away from the reduced diameter hub portion, the support platform including an angled umbrella flange disposed at least partially along a perimeter of the support platform; and
a head portion of injection molded polymer, the head portion being adapted for operative connection to a second structure for disposition in opposing relation to the first structure, wherein the head portion includes a first circumferential flange defining a first platform at least partially surrounding the proximal barrel segment in bonded relation to the proximal barrel segment and a second circumferential flange defining a second platform at least partially surrounding the proximal barrel segment in bonded relation to the proximal barrel segment at a position spaced apart from the first circumferential flange, the head portion further including a connecting wall extending between the first circumferential flange and the second circumferential flange, wherein the molded-in fracture line extends circumferentially about the proximal barrel segment at an interface between the proximal barrel segment and the first circumferential flange, the molded-in fracture line including a protuberance molded into the first circumferential flange at the interface in combination with an opposing complimentary mating depression molded into the proximal barrel segment at the interface such that the protuberance is normally nested in bonded relation within the mating depression.

11. The one piece snap-in retainer as recited in claim 10, wherein the head portion is formed from a first injection molded polymer and the base clip portion is formed from a second injection molded polymer, the second injection molded polymer having a melting point which is less than that of the first injection molded polymer.

12. The one piece snap-in retainer as recited in claim 11, wherein the proximal barrel segment includes a rear axial opening and a hollow axial core extending partially along the length of the proximal barrel segment.

13. The one piece snap-in retainer as recited in claim 12, wherein the head portion is a contiguous structure formed during a first shot of a two shot injection molding process.

14. The one piece snap-in retainer as recited in claim 13, wherein the base clip portion is a contiguous structure formed during a second shot of the two shot injection molding process.

15. A method of forming a one-piece snap-in retainer of multi-shot molded construction adapted to separate along a molded-in fracture line upon application of axial tensioning force, the retainer having a base clip portion of molded polymer, the base clip portion being adapted for snap-fit insertion into an acceptance opening in a first structure, the base clip portion including a proximal barrel segment that is cylindrical in shape and a distal snap-in element projecting outwardly away from the proximal barrel segment, the retainer also having a head portion of molded polymer, the head portion being adapted for operative connection to a second structure for disposition in opposing relation to the first structure, wherein the head portion at least partially surrounds the proximal barrel segment in melt-bonded relation to the proximal barrel segment; the method comprising the steps of:
providing a mold having a three-dimensional mold cavity;
introducing a cylindrical sleeve insert tool into the mold to a first position within the mold cavity, wherein the sleeve insert tool has a cross-section substantially conforming with the proximal cross-section of the proximal barrel segment and wherein either an annular protuberance or annular groove is disposed at a defined height along the sleeve insert tool corresponding to the position of an interface between the head portion and the proximal barrel segment;
introducing an axial plug at an interior of the cylindrical sleeve insert tool to a defined depth;
injecting a first polymer shot into the mold cavity to form the head portion in surrounding relation to the sleeve insert tool such that the head portion includes a first molded-in surface structure in relief to the annular protuberance or annular groove on the sleeve insert tool;
partially withdrawing each of the sleeve insert tool and the axial plug; and injecting a second polymer shot into the mold cavity to form the base clip portion such that the proximal barrel segment includes a second molded-in surface structure in mated relation to the first molded-in surface structure, wherein the head portion and the proximal barrel segment are melt-bonded together along the interface intersecting the first and second molded-in surface structures, wherein the first and second molded-in surface structures define stress concentrating irregularities at the interface facilitating fracture at the interface and separation of the head portion from the base clip portion upon application of the axial tensioning force; and fully removing each of the cylindrical sleeve insert tool and the axial plug to define a rear axial opening and a hollow axial core in the proximal barrel segment, the hollow axial core extending from the rear axial opening to a depth beyond the molded-in fracture line.

16. The method as recited in claim 15, wherein the head portion is formed from a first polymer and the base clip portion is formed from a second polymer, the second polymer having a melting point which is less than that of the first polymer.

\* \* \* \* \*